J. A. CLARKE, Jr.
SYSTEM OF CONTROL.
APPLICATION FILED NOV. 4, 1918.
1,396,812.
Patented Nov. 15, 1921.
2 SHEETS—SHEET 1.
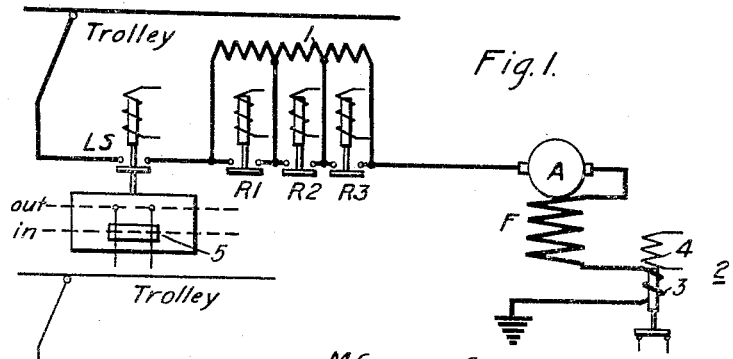
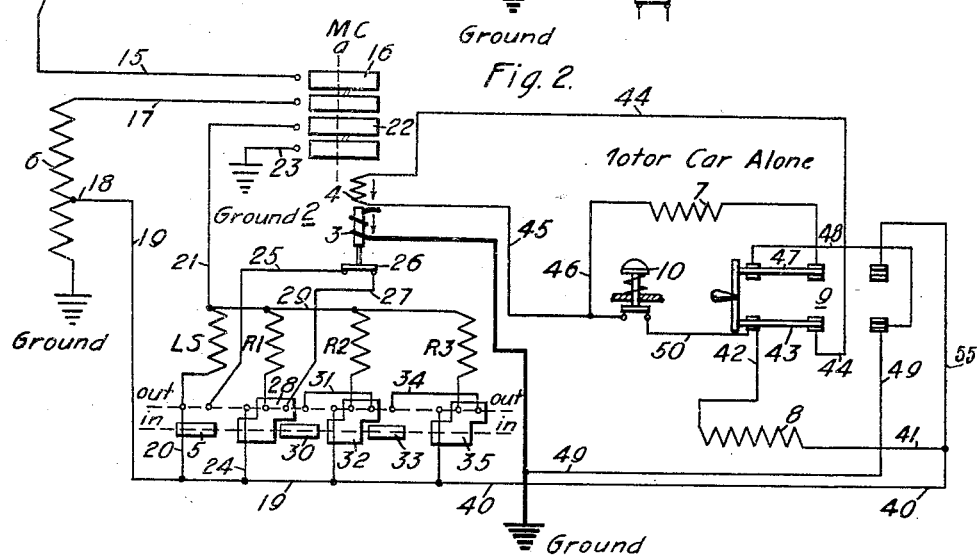
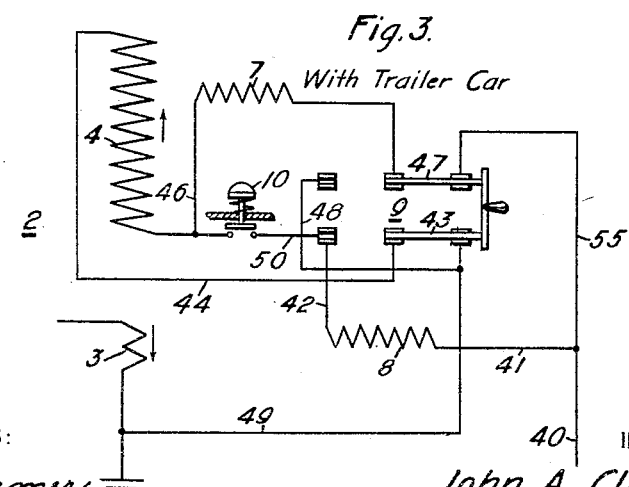
WITNESSES:
H. J. Shelhamer
W. R. Coley
INVENTOR
John A. Clarke, Jr.
BY
Berley G. Carr
ATTORNEY J. A. CLARKE, Jr.
SYSTEM OF CONTROL.
APPLICATION FILED NOV. 4, 1918.

1,396,812.

Patented Nov. 15, 1921.
2 SHEETS—SHEET 2.

WITNESSES:
H. T. Shelhamer
W. P. Coley

INVENTOR
John A. Clarke, Jr.
BY
Wesley S. Carr
ATTORNEY

UNITED STATES PATENT OFFICE.

JOHN A. CLARKE, JR., OF EDGEWOOD PARK, PENNSYLVANIA, ASSIGNOR TO WESTINGHOUSE ELECTRIC & MANUFACTURING COMPANY, A CORPORATION OF PENNSYLVANIA.

SYSTEM OF CONTROL.

1,396,812.

Specification of Letters Patent.  Patented Nov. 15, 1921.

Application filed November 4, 1918. Serial No. 261,022.

*To all whom it may concern:*

Be it known that I, JOHN A. CLARKE, Jr., a citizen of the United States, and a resident of Edgewood Park, in the county of Allegheny and State of Pennsylvania, have invented a new and useful Improvement in Systems of Control, of which the following is a specification.

My invention relates to systems of control and particularly to the use of compound or double-coil limit switches or current relays in connection with the automatic acceleration of electric railway motors and the like.

One object of my invention is to provide a simple, inexpensive and convenient auxiliary apparatus for systems of the above-indicated character, whereby the connections of a shunt or auxiliary coil upon the limit switch or current relay may be readily manipulated to provide a higher accelerating current either when a motor car alone is operating or when a trailer car is also being hauled.

Another object of my invention is to provide simple control apparatus in the form of a double-throw switch and a push-button for varying the setting of the limit switch or current relay, whereby the proper values of current for normal or level track operation may be provided for either motor-car operation alone or operation along with a trailer car, by merely throwing the hand switch to the one or the other position, a higher accelerating current for use in propelling the vehicle up a grade being provided in either case by merely pressing the push-button.

Other objects and advantages of the present invention, particularly its flexibility of adaptation to various operating conditions, will become apparent from the following detailed description.

Figure 4:
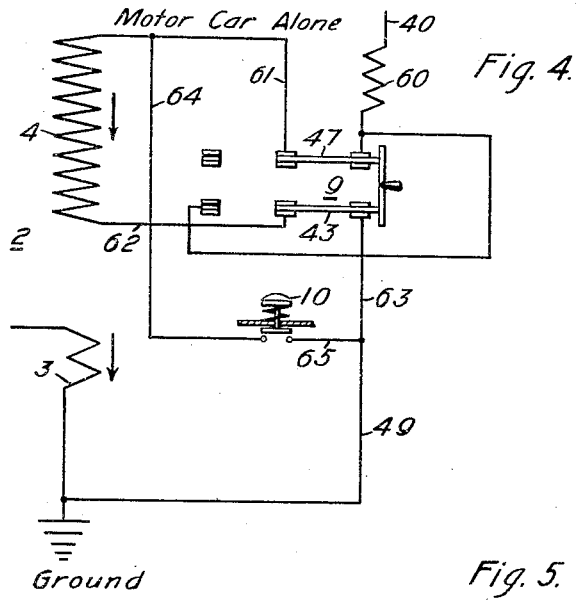
Figure 5:
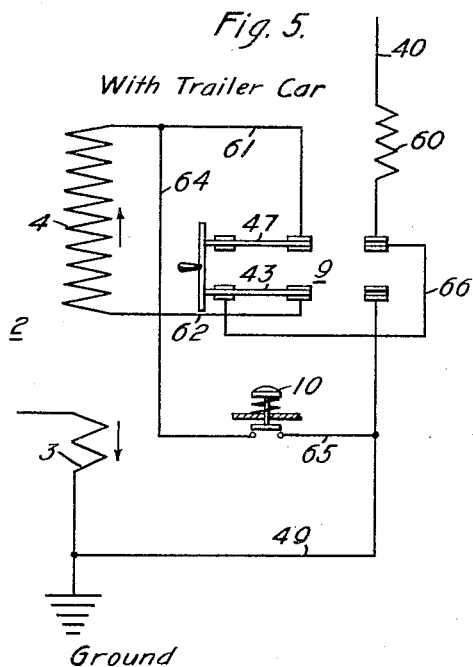

My invention may best be understood by reference to the accompanying drawings, wherein Figure 1 is a diagrammatic view of the main circuits of a system of control embodying my invention; Fig. 2 is a diagrammatic view of the auxiliary or governing circuits, including the limit-switch shunt-coil circuits, for manipulating the switches illustrated in Fig. 1 and for effecting automatic acceleration of the illustrated motor; Fig. 3 is a diagrammatic view corresponding to the limit-switch-coil connections of Fig. 2 for a different type of operation, namely, when a motor car is hauling a trailer car; and Fig. 4 and Fig. 5 are diagrammatic views, corresponding, respectively, to a portion of Fig. 2 and to Fig. 3, of a modification of my invention.

Referring to Fig. 1, the system shown comprises supply-circuit conductors Trolley and Ground; a vehicle-propelling motor having a commutator-type armature A and a field winding F of the series type; a line switch LS for connecting the motor to the supply circuit; an accelerating resistor 1, which may be short-circuited in sections by a plurality of suitable switches R1, R2 and R3; and a compound limit switch or current relay 2 having the familiar series coil 3 and an auxiliary or shunt coil 4, the connections of which are manipulated in a simple manner to be described to afford proper accelerating-current conditions during various operations of the motor.

To provide the familiar automatic acceleration under the control of the limit switch, a plurality of interlocks or auxiliary contact members, such as 5, which is illustrated in connection with the line switch LS, are provided, the interlock 5 being actuated by the switch LS to close an auxiliary circuit when the switch occupies its closed or "in" position. The remaining switches are likewise provided with interlocks which, for the sake of simplicity, are illustrated only in Fig. 2 in conjunction with the complete circuits of which they form a part.

It will be understood that, although Fig. 1 illustrates a single propelling motor and a series-connected accelerating resistor, the application of my invention is not limited to this particular type of system, but may readily be employed in connection with any known type of electric-railway control system, or the equivalent. The best application of my invention that is known to me at present is in connection with motor cars which are required to haul trailer cars at times and to accelerate, either alone or with the trailer, on comparatively steep grades as well as on level track. In such cases, acceleration on substantially level track is to be considered as the normal condition, and acceleration on steep grades as the special or occasional condition, to meet which the push-button provided in my invention is employed.

Referring to Fig. 2, the auxiliary governing system shown comprises suitable supply-circuit conductors which, in the present case, are illustrated as Trolley and Ground, across which a control resistor 6 of a familiar type may be connected by a master controller MC, which is illustrated as having a single operative position $a$. The auxiliary system further comprises the actuating coils for the switches LS, R1, R2 and R3, together with the auxiliary contact members of the limit switch or current relay and the adjustable circuits for the shunt coil 4 of the limit switch. These adjustable circuits comprise a plurality of small resistors which may conveniently take the form of the familiar resistance tubes, a double-pole, double-throw switch 9 and a push-button device 10. The hand switch 9 is thrown to its illustrated left-hand position when the motor car alone is being operated and is actuated to its right-hand position, as illustrated in Fig. 3, when the trailer car is being hauled, as indicated in Fig. 2 and in Fig. 3, respectively, by the legends "Motor car alone" and "With trailer car".

The operation of the system, without regard to the changes effected by my novel auxiliary limit-switch-coil connections, will first be described and then such novel connections and the results thereof will be set forth. Assuming, therefore, that it is desired to accelerate the illustrated motor, the master controller MC is actuated to its operative position $a$, whereby an auxiliary circuit is established from the Trolley through conductor 15, contact segment 16 of the master controller, conductor 17 and control resistor 6 to the negative conductor Ground.

Since the full-supply-circuit voltage is considerably higher than that ordinarily desired for control purposes, a suitable low-voltage tap 18 upon the control resistor 6 is employed, from which tap, circuit is continued through conductors 19 and 20, actuating coil of the line switch LS, conductor 21, contact segment 22 of the master controller, and conductor 23, to ground. The line switch LS is thus closed, and a series connection of the propelling motor with the accelerating resistor 1 and the series coil 3 of the limit switch 2 is thereby effected.

The initial rush of current incident to closing the circuit just traced causes the limit switch 2 to rise to its upper or open-circuit position temporarily, in accordance with familiar operating principles. As soon as the current has dropped to a predetermined value, dependent upon the mechanical setting of the limit switch plunger and also upon the relation of the two actuating coils 3 and 4, as subsequently described in detail, the limit switch drops to its lower or circuit-closing position to establish a circuit from the positively energized interlock or auxiliary contact member 5 of the line switch LS, through conductor 25, auxiliary contact members 26 of the limit switch 2, conductor 27, interlock 28-R1-out, actuating coil of the switch R1, and conductor 29, to the negatively-connected conductor 21. The switch R1 is thus closed to short-circuit a certain portion of the accelerating resistor 1 and thereby effect a predetermined increase of the motor speed.

Upon the closure of switch R1, a holding circuit therefor of a familiar type is formed, including the positively-energized conductor 19, conductor 24, interlock 28-R1-in and the actuating coil of the switch R1.

As soon as the limit switch has again dropped to its lower position, after the closure of the switch R1, a further circuit is established from the limit-switch contact members 26 through conductor 27, interlock 30-R1-in, conductor 31, interlock 32-R2-out, actuating coil of the switch R2 and return conductor 29. The switch R2 is thus closed to short-circuit a second section of the main resistor 1 and thus further accelerate the propelling motor.

Upon the return of the limit switch to its lower position, after the closure of the switch R2 and the establishment of a holding circuit therefor, similar to that described in connection with the switch R1, the conductor 31, which is connected to the limit-switch contact member 26, also makes connection with interlock 33-R2-in, whence circuit is continued through conductor 34, interlock 35-R3-out, and the actuating coil of switch R3, to negative conductor 29. A holding circuit of the type previously mentioned is also completed upon the closure of switch R3. The remaining section of the accelerating resistor 1 is thus short-circuited to bring the motor to full-speed conditions.

Referring now to the action of the limit-switch shunt coil 4, when operating a motor car alone on substantially level track, the hand switch 9 occupies its illustrated left-hand position, and the push-button 10 open-circuits the associated control connections. Consequently, a circuit is established from the positively-energized conductor 19 through conductors 40 and 41, resistor 8, conductor 42, lower switch blade 43, conductor 44, shunt actuating coil 4 of the limit switch, through which coil current flows in the same direction as in the series coil 3, as indicated by the arrows, circuit being continued through conductors 45 and 46, resistor 7, upper switch blade 47, conductors 48 and 49, to negative supply conductor Ground. A certain auxiliary or shunt coil flux, which is relatively weak by reason of the series connection of the resistors 7 and 8 with the shunt coil 4, is thus added to that produced by the series coil 3 of the limit switch to conjointly provide the proper current setting or value at which the limit switch drops to its circuit-closing position for operation of the motor car alone on substantially level track.

In case an up-grade is encountered and it is desired to permit a heavier accelerating current, to drive the vehicle up the hill in a shorter time or to insure complete operation of the system, it is merely necessary to depress the push-button 10, whereby the shunt actuating coil 4 of the limit switch is short-circuited, since one terminal of the push-button 10 is connected through conductor 45 directly to the lower end of the shunt coil 4, while the other terminal of the push-button is connected, through conductor 50, switch blade 43 and conductor 44, to the upper end of the shunt coil. Since the auxiliary coil 4 is thus short-circuited as long as the push-button 10 is depressed, it follows that a greater flux, requiring a heavier current, must traverse the series actuating coil 3 to hold the limit-switch plunger in its upper or open-circuit position, or, in other words, a heavier average accelerating current is provided whenever the push-button 10 is held down to insure a desirably rapid propulsion of the railway vehicle up the grade in question.

If the motor car is to haul a trailer car, the only preparative manipulation required by the train operator or motorman, is to throw the hand switch 9 to the right-hand position, illustrated in Fig. 3, before the train is started. Under such conditions, the shunt actuating - coil circuit may be traced from positively - energized conductor 40, through conductor 55, upper switch blade 47, resistor 7, conductor 46, shunt coil 4, which now produces a flux opposing that of the series actuating coil 3, as indicated by the arrows, whence circuit is completed through conductor 44, lower switch blade 43, and conductor 49 to ground. In this instance, only the resistor 7 is in series relation with the shunt coil 4, thus providing a stronger shunt-coil flux than was the case with motor-car operation alone. Furthermore, since this shunt flux opposes the series flux, the setting of the limit switch is higher than that for motor-car operation, whereby the combined motor car and trailer may be operated at a schedule speed substantially equal to, or greater than, that of the motor car alone, dependent upon the particular design of limit-switch parts, as will be understood.

By depressing the push-button 10 when an upgrade is encountered, the resistors 7 and 8 are connected in parallel relation, as will be readily observed, without the circuits being traced in detail, thus producing a still higher current in the shunt coil 4 and, therefore, providing a higher accelerating current for the purpose of propelling the combined motor car and trailer up the incline.

The shunt-coil circuits illustrated in Fig. 2 and Fig. 3 are particularly adapted for use in cases where a higher accelerating current is required for the motor car and trailer on level track than is required for the motor car alone up a grade. The auxiliary circuits illustrated in Fig. 4 and Fig. 5, on the other hand, are particularly adapted for the special case where the relations of motor-car weight, trailer-car weight and per cent. of up-grade are such that substantially the same accelerating current is required to accelerate the motor car alone on the up-grade as is required to accelerate the motor car, along with the trailer, on level track.

Referring to Fig. 4 and Fig. 5, it will be noted that a single resistor 60 is employed in lieu of the two resistors 7 and 8, while certain of the circuit connections differ from those illustrated in Fig. 2 and Fig. 3, as about to be described in detail. With the hand switch 9 occupying its right-hand position, corresponding to motor-car operation alone and as illustrated in Fig. 4, an auxiliary circuit is continued from the positively-energized conductor 40, through conductor 60, upper switch blade 47, conductor 61, shunt coil 4, conductor 62, lower switch blade 43, and conductors 63 and 49, to ground.

In the present instance, the shunt coil 4 adds its flux to that of the series coil 3, as is the case in the system shown in Fig. 2. The limit-switch setting required for the various operating conditions to be met when the motor car alone is operating on level track is thus provided.

To accelerate the motor at a desirably rapid rate up the above-mentioned grade, the push-button 10 is depressed to connect conductors 61 and 63 directly through conductor 64, push-button 10 and conductor 65, or, in other words, to short-circuit the shunt coil 4 and thus increase the current setting of the limit switch to provide the desired heavier accelerating current.

In the case of trailer-car operation, the hand switch 9 is first thrown, by the train operator, to its left-hand position, as illustrated in Fig. 5, whereby, when operating on level track, that is, with the push-button in its open-circuit position, no current traverses the shunt coil 4, since the circuit thereof is dead-ended at the upper switch blade 47. In this way, substantially the same accelerating current is provided for the motor car along with the trailer when operating on level track as was provided for the motor car alone when ascending a grade, since, in both cases, the shunt coil 4 is rendered inoperative.

Upon encountering an up grade during trailer-car operation, the push-button 10 is depressed to establish an auxiliary circuit from the positively-energized conductor 40, through resistor 60, conductor 66, lower switch blade 43, conductor 62 shunt coil 4, in a direction to create a flux opposing that of the series coil 3, as indicated by the arrows, whence circuit is completed through conductor 64, push-button 10 and conductors 65 and 49 to ground. In this way, the current required to prevent the limit switch 2 from dropping to its lower position must increase in the series coil 3 to a degree sufficient to overcome the opposing or differential action of the shunt coil 4, or, in other words, a higher accelerating current for the motor is provided.

It will be seen, from the foregoing description, that I have provided a relatively simple control arrangement, whereby the shunt actuating coil of a limit switch may be conveniently manipulated to provide the desired results by reason of its magnetic relation to the series actuating coil 3. The various car weights, size of motors used and grades to be met naturally affect the value and arrangement of resistors to be used in the shunt-coil circuit. However, the particular values to be employed may be readily worked out before applying the circuits that I illustrate to any given control system.

The advantages of using the auxiliary apparatus that I have described may be set forth as follows. A number of current settings or dropping-points on the limit switch are provided for one mechanical adjustment of the plunger-weight position, only a relatively small number of switch manipulations and a minimum of apparatus being used. The same manipulation of control apparatus, namely depressing the push-button 10 only, is required to provide a higher accelerating current either when operating the motor car alone or both the motor car and the trailer. A very simple change of connections, namely, merely throwing the hand switch 9, is required when adding or taking off a trailer car, and no further adjustment of master-controller or other circuits is necessary. The invention is simple and straightforward in its operation and will not be confusing to train crews and inspectors. All adjusting apparatus comprises simple and inexpensive switches and resistance tubes. The extreme flexibility of the invention permits its application to control systems operating under a wide range of conditions.

I do not wish to be restricted to the specific circuit connections and arrangement of parts herein set forth, as various modifications thereof may be made without departing from the spirit and scope of my invention. I desire, therefore, that only such limitations shall be imposed as are indicated in the appended claims.

I claim as my invention:

1. In a control system, the combination with a limit switch having a series and a shunt actuating coil, of means comprising one switching device having only two active positions and another having only one active position for providing four settings of said relay device, both of said switching devices being associated with only one of said coils.

2. In a control system, the combination with a limit switch having a series and a shunt actuating coil, of means comprising a double-pole, double-throw switch and a push-button device for providing four settings of said relay device, both said switch and said push-button device being connected in circuit with said shunt coil only.

3. In a control system, the combination with a relay device having two actuating coils, of a plurality of resistors, a two-position switching device for connecting different numbers of said resistors in series relation with one of said actuating coils, and a second switching device for short-circuiting that coil or for connecting said resistors in parallel relation, dependent upon the position of said two-position switching device.

4. In a control system, the combination with a limit switch having a series and a shunt actuating coil, of a pair of resistors, a double-pole, double-throw switch for connecting one or both of said resistors in series relation with said shunt coil, and a push-button device for short-circuiting that coil or for connecting the resistors in parallel relation, dependent upon the position of said switch.

In testimony whereof I have hereunto subscribed my name this 31st day of Oct., 1918.

JOHN A. CLARKE, Jr.